United States Patent [19]

Hasegawa

[11] Patent Number: 5,724,563
[45] Date of Patent: Mar. 3, 1998

[54] PIPELINE PROCESSSOR

[75] Inventor: Katsuya Hasegawa, Suita, Japan

[73] Assignee: Matsushita Electric Industrial Co., Ltd., Kadoma, Japan

[21] Appl. No.: 629,216

[22] Filed: Apr. 8, 1996

[30] Foreign Application Priority Data

Apr. 12, 1995 [JP] Japan .................. 7-086844

[51] Int. Cl.$^6$ .................. G06F 9/32; G06F 9/38
[52] U.S. Cl. .................. 395/580
[58] Field of Search .................. 395/580, 584, 395/585

[56] References Cited

FOREIGN PATENT DOCUMENTS 5108345  4/1993  Japan .

Primary Examiner—David Y. Eng
Attorney, Agent, or Firm—Renner, Otto, Boisselle & Sklar, P.L.L.

[57] ABSTRACT

According to the present invention, a pipeline processor is provided for executing a predictive branch instruction defining a number of at least one instruction which is to be executed in succession after the predictive branch instruction is given before a control flow is changed. The pipeline processor includes: a program counter for holding an address of an instruction to be fetched; an instruction memory for outputting an instruction corresponding to the address held by the program counter; an instruction register for fetching and holding the instruction output from the instruction memory; an instruction decoding section for decoding the instruction held by the instruction register, thereby judging whether or not the instruction is the predictive branch instruction; a counter section for holding a counter value and comparing the counter value with a predetermined threshold value, the counter value being initialized to the number defined by the predictive branch instruction and being decremented in synchronization with an increment of the program counter; an adder for incrementing the address held by the program counter and providing the incremented address as a sequential instruction address; a branch target address register for providing a branch target address of the predictive branch instruction; and a selector for selecting one of the sequential instruction address and the branch target address of the predictive branch instruction in accordance with a comparison result obtained by the counter section.

8 Claims, 12 Drawing Sheets

From instruction decoding section 3

From subtracter 34

Input timing of initial value setting signal 104

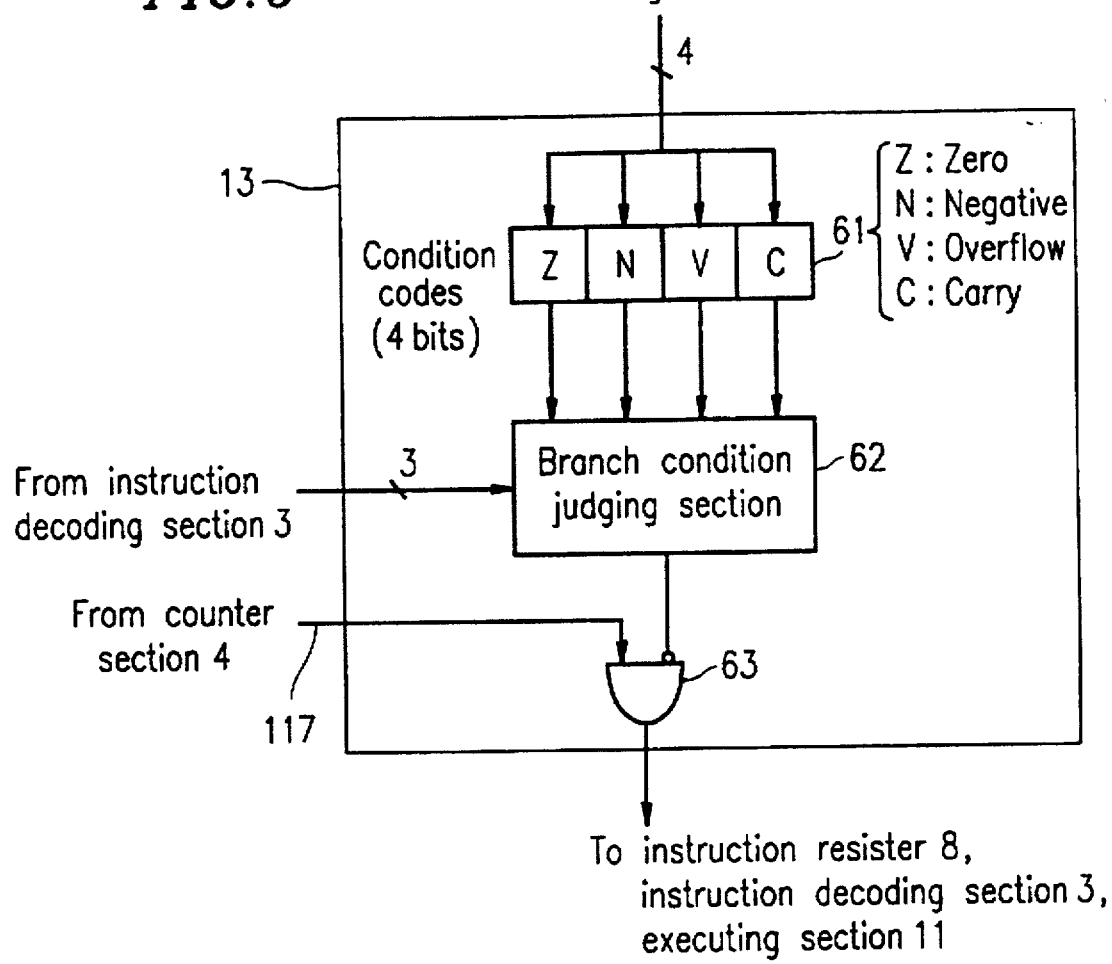

PIPELINE PROCESSSOR

BACKGROUND OF THE INVENTION

1. Field of the Invention

The present invention relates to a pipeline processor which can perform pipeline processing for a plurality of instructions.

2. Description of the Related Art

Virtually all of the processors now practically used perform pipeline processing. "Pipeline processing" means processing a plurality of instructions in parallel by dividing one execution process of an instruction into a plurality of stages and overlapping the plurality of stages, whereby the performance of a processor can be improved. A processor performing such pipeline processing is called a "pipeline processor".

In order to execute a branch instruction, a pipeline processor is required to recognize a given instruction as a branch instruction by fetching and decoding the instruction, judging the conditions to decide whether or not a branch should be performed, calculating an address of the target branch (hereinafter, such an address will be referred to as a "branch target address") and then changing the address of the instruction to be fetched next time. However, at a point where the address of the instruction to be fetched next time is changed in compliance with a branch instruction, a sequential instruction (or sequential instructions) succeeding the branch instruction has (have) already been fetched. Therefore, the instruction which has erroneously been fetched should be abandoned and then the instruction of the target branch should be re-fetched. The number of cycles consumed during the period from the abandonment of the instruction which has erroneously been fetched until the re-fetch of the instruction of the target branch is equal to a delay caused by the execution of the branch instruction.

A branch instruction changing the flow of a control considerably degrades the performance of a pipeline processor, because such a branch instruction prevents an instruction from being smoothly supplied to the pipeline and thereby stalls the pipeline.

In a generally used application program, the proportion of branch instructions to all the instructions is in a range from 20% to 30%. Assuming that a loss of three cycles is caused by every execution of one branch instruction, the total performance of a pipeline processor is degraded by 60% to 90%, because the execution of the branch instructions stalls the pipeline.

Thus, the delay resulting from the execution of a branch instruction, i.e., a penalty, becomes a major factor in the degradation of the performance of a pipeline processor.

Various approaches employed for preventing stalls in a pipeline can be generally classified into the following two categories: one of them includes approaches for preventing stalls in a pipeline by eliminating a delay in judging conditions, and the other includes approaches for preventing stalls in a pipeline by eliminating a delay in calculating a branch target address.

Various branch prediction methods are known as the procedures for eliminating a delay in judging conditions. However, only a few methods are known as the procedures for eliminating a delay in calculating a branch target address.

A method using a branch target buffer (hereinafter the buffer will be abbreviated as "BTB") is known as an exemplary method for eliminating a delay in calculating a branch target address. According to this method, a branch target address previously calculated is stored in a BTB, thereby reusing the branch target address. Therefore, this method makes it possible to obtain a branch target address of a branch instruction before decoding the branch instruction.

FIG. 11 shows a configuration for a conventional processor using a BTB 10. As shown in FIG. 12, the BTB 10 has in each row a region 41 for storing a tag therein, a region 42 for storing branch target address therein and a region 43 for storing a branch history therein. When a branch instruction is executed, the upper bits of the address of the branch instruction in an instruction memory 1 are stored in the regions 41, the branch target address of the branch instruction is stored in the regions 42 and the branch history of the branch instruction is stored in the regions 43. The row positions of the regions 41, 42 and 43 in the BTB 10 are determined by the lower address of the branch instruction.

The address of the instruction to be fetched next time (hereinafter, such an address will be referred to as a "PC address") is stored in a program counter 2. Using the lower bits, e.g., 8 bits, of the PC address as an index, the upper bits of the PC address and the tag stored in a region 41 of the BTB 10 are compared with each other with reference to the BTB 10.

If the upper bits of the PC address are equal to the tag stored in the region 41 of the BTB 10, then the branch instruction corresponding to the PC address turns out to be an instruction which was executed previously. The branch target address of the branch instruction is stored in the region 42 corresponding thereto in the BTB 10. Therefore, in the case where the upper bits of the PC address are equal to the tag stored in the region 41 of the BTB 10, not the PC address but instead the branch target address stored in the region 42 in the BTB 10 is output to the instruction memory 1. The branch history stored in the region 43 of the BTB 10 may be referred to in judging whether or not the branch target address stored in the region 42 in the BTB 10 should be output to the instruction memory 1 instead of the PC address. The branch history can be used for predicting whether or not the branch will occur.

In the case where the upper bits of the PC address are not equal to the tag stored in the region 41 of the BTB 10, the PC address is output to the instruction memory 1 in a similar manner to an ordinary cycle of fetching an instruction.

Thus, in the case where the upper bits of the PC address are equal to the tag stored in the region 41 of the BTB 10, the branch target address of the branch instruction can be obtained in the same cycle as a cycle of fetching an instruction. In other words, the calculation of the branch target address has already been completed before performing a cycle of decoding an instruction.

Another exemplary method for eliminating a delay in calculating the branch target address is a method for architecturally defining a delayed branch. According to this method, a delay in calculating the branch target address can be eliminated by executing a predetermined number of instructions following the branch instruction irrespective of whether or not a branch is actually caused.

In the above-described method using a BTB, the BTB requires a memory of a large capacity. In order to attain a practical effect, the entry number required for such a BTB is at least 1024. This entry number corresponds to a memory of 6 to 7 Kbytes, and such a memory occupies a considerable area on a chip. In addition, in order to prevent stalls in a pipeline, it is necessary to access the BTB within one cycle, which greatly restrains the operation rate of a processor.

On the other hand, in the above-described delayed branch method, the performance of the delayed branch depends upon a proportion of delay slots filled with effective instructions by a compiler. Since the instructions filling the delay slots are executed without fail irrespective of whether or not a branch is caused, such instructions must not affect the branch conditions. In general, it is not easy for a compiler to find such instructions, because it is difficult to judge whether or not the instructions affect the branch conditions before executing the instructions.

In the case where the number of the cycles required for fetching one instruction is one, it is possible to fill about 90% of delay slots with effective instructions. However, as the number of the cycles required for fetching one instruction increases, it becomes increasingly difficult to fill the delay slots with effective instructions, because the number of the instructions to fill the delay slots increases. Therefore, it is difficult to apply a delayed branch method to a multi-stage pipeline processor or a super scalar machine.

In the case where it is impossible to fill delay slots with effective instructions, a compiler fills the delay slots with NOP (no operation) instructions, whereby the program size is increased redundantly.

SUMMARY OF THE INVENTION

According to the present invention, a pipeline processor is provided for executing a predictive branch instruction defining a number of at least one instruction which is to be executed in succession after the predictive branch instruction is given before a control flow is changed. The pipeline processor includes: a program counter for holding an address of an instruction to be fetched; an instruction memory for outputting an instruction corresponding to the address held by the program counter; an instruction register for fetching and holding the instruction output from the instruction memory; an instruction decoding section for decoding the instruction held by the instruction register, thereby judging whether or not the instruction is the predictive branch instruction; a counter section for holding a counter value and comparing the counter value with a predetermined threshold value, the counter value being initialized to the number defined by the predictive branch instruction and being decremented in synchronization with an increment of the program counter; an adder for incrementing the address held by the program counter and providing the incremented address as a sequential instruction address; a branch target address register for providing a branch target address of the predictive branch instruction; and a selector for selecting one of the sequential instruction address and the branch target address of the predictive branch instruction in accordance with a comparison result obtained by the counter section.

In one embodiment, the predictive branch instruction includes: a region for storing an opecode identifying a kind of the instruction; a region for specifying the branch target address; and a region for storing the number of at least one instruction which is to be executed in succession after the predictive branch instruction is given before a control flow is changed.

In another embodiment, the predetermined threshold value is equal to a number of cycles required for fetching one instruction.

In still another embodiment, in a case where the counter value is equal to the predetermined threshold value, the counter section outputs a selection signal selecting the branch target address of the predictive branch instruction to the selector.

In still another embodiment, in a case where the number defined by the predictive branch instruction is smaller than the predetermined threshold value, the counter section outputs a selection signal selecting the branch target address of the predictive branch instruction to the selector.

In still another embodiment, in a case where the number defined by the predictive branch instruction is smaller than the predetermined threshold value, the counter section outputs a cancel signal cancelling the instruction held by the instruction register to the instruction register.

In still another embodiment, the pipeline processor further includes a condition judging section for judging whether or not the control flow is to be changed to the predictive branch instruction. When the counter value reaches the predetermined value, the counter section outputs a signal defining a timing at which it is judged whether or not the control flow is to be changed to the predictive branch instruction to the condition judging section.

In still another embodiment, in a case where the condition judging section judges that the control flow is not to be changed to the predictive branch instruction, the condition judging section outputs a signal cancelling the instruction held by the instruction register to the instruction register and outputs a signal cancelling the instruction to be decoded by the instruction decoding section to the instruction decoding section.

Hereinafter, the functions of the present invention will be described.

In the pipeline processor according to the present invention, an actual change of a control flow is not performed immediately after fetching and decoding the instruction to change the control flow, but instead it is performed after a number of instructions have been executed during the period from the point where the instruction to change the control flow is given to the point where the encoded control flow is changed. The target address of the control has already been calculated at a point where the instruction to change the control flow is decoded, and therefore the target address has already been prepared at the point where the control flow is actually changed. Therefore, it is possible to quickly change the control flow, i.e., the target of the fetch, at the point where the target of the fetch is changed. As a result, it is no longer necessary to abandon a sequential instruction which has erroneously been fetched and then re-fetch the instruction of the target branch unlike the case of a conventional branch instruction.

Thus, the invention described herein makes possible the advantages of (1) providing a pipeline processor which can prevent a delay by executing a branch instruction without using a memory of a large capacity or affecting an operation rate and (2) providing a pipeline processor which can prevent a delay by executing a branch instruction even when the number of the cycles required for fetching one instruction increases.

These and other advantages of the present invention will become apparent to those skilled in the art upon reading and understanding the following detailed description with reference to the accompanying figures.

BRIEF DESCRIPTION OF THE DRAWINGS

FIG. 4A is a block diagram showing a configuration for a control signal generating section 38, while

FIG. 5A is a diagram showing a program code sequence including a predictive branch instruction, while FIG. 5B is a timing chart illustrating the operation of the pipeline processor 100 in the case where A=2 and B=3.

FIG. 9 is a block diagram showing a configuration for a condition judging section 13.

FIG. 10A is a diagram showing a program code sequence including a conventional branch instruction, while

DESCRIPTION OF THE PREFERRED EMBODIMENTS

Hereinafter, embodiments of the present invention will be described with reference to the accompanying drawings.

Figure 1:
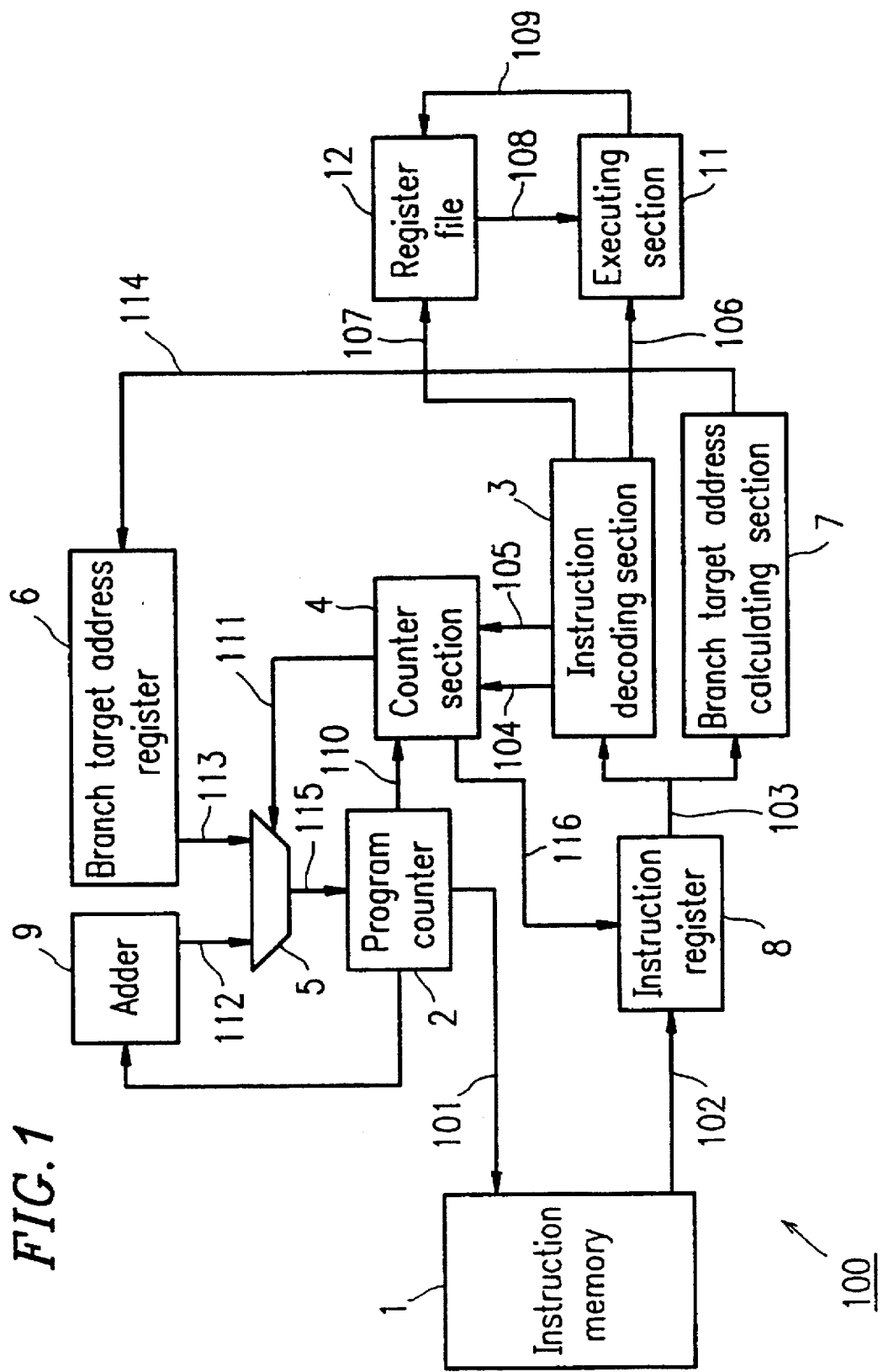
FIG. 1 is a block diagram showing a configuration for a pipeline processor 100 according to the present invention.

FIG. 1 shows a configuration for a pipeline processor 100 according to the present invention.

A program counter 2 holds an address 101 of an instruction to be fetched next time. The program counter 2 outputs the held address 101 to an instruction memory 1. A plurality of instructions are stored in the instruction memory 1. An instruction 102 is specified among the plurality of instructions stored in the memory 1 by the address 101 output from the program counter 2, and is fetched to an instruction register 8 and held therein.

Various kinds of instructions can be stored in the instruction memory 1. These instructions are classified into sequential instructions and branch instructions.

In this specification, a "sequential instruction" is defined as an instruction which does not change the flow of a control. Therefore, next to a sequential instruction, an instruction, corresponding to an address next to the address in the instruction memory 1 where the sequential instruction is stored, is executed. A "branch instruction" is defined as an instruction which changes the flow of a control. Therefore, the "branch instruction" includes, for example, a condition branch instruction, an unconditional jump instruction, a sub-routine call instruction, a return instruction and the like.

Figure 2:
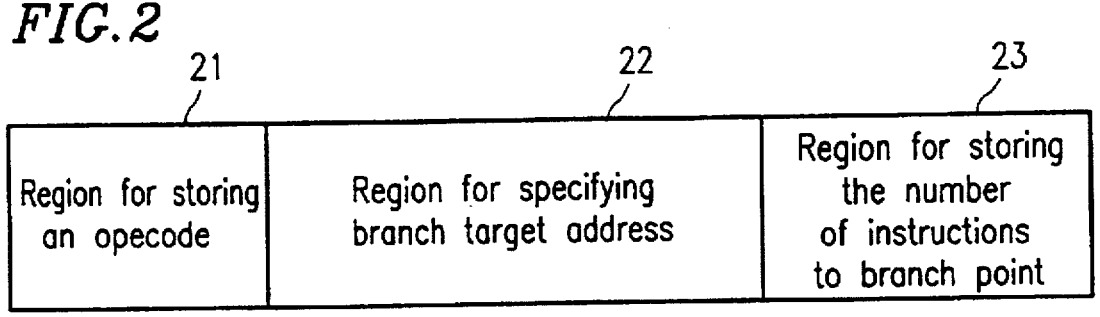
FIG. 2 is a format chart showing a format for a branch instruction used in the pipeline processor 100.

FIG. 2 shows a format for the branch instruction used in the pipeline processor 100. In this specification, the branch instruction shown in FIG. 2 is called a "predictive branch instruction". A "predictive branch instruction" is an instruction to branch to a branch target address after a predetermined number of instructions are executed from the "predictive branch instruction". The predetermined number is given as an operand of the predictive branch instruction.

For example, a "predictive branch instruction of a branch to an instruction X after two instructions are executed" is represented as "Branch after 2 to X" as a program code. The address of the instruction X is calculated as a branch target address of the branch instruction by the pipeline processor 100.

A predictive branch instruction has a region 21 for storing an opcode therein, a region 22 for specifying a branch target address, and a region 23 for storing the number of at least one instruction which is to be executed in succession after the predictive branch instruction is given before the control flow is changed, i.e., a branch point.

An "opcode" is a code for identifying a kind of a given instruction. An opcode is generally composed of a plurality of bits.

A branch target address is specified, for example, in a direct addressing mode or in an indirect addressing mode.

In the direct addressing mode, a branch target address is specified, for example, by an absolute address. In this case, a code indicating the direct addressing mode and the absolute address are stored in the region 22.

In the indirect addressing mode, a branch target address is specified by a relative address with respect to a base address. In this case, a code indicating the indirect addressing mode and a relative address (or a displacement from the predictive branch instruction to the branch point) are stored in the region 22. Typically, an address held in the program counter 2 is used as the base address. Alternatively, an address held in another register may also be used as the base address.

The number of instructions, which are executed from a point where a current execution instruction is given to a point where the control flow is changed, i.e., a branch point, is specified by zero or a positive integer. Zero or a positive integer is given as an operand of the predictive branch instruction. For example, in the case where the predictive branch instruction is represented by a program code as "Branch after 2 to X", a positive integer "2" is stored in the region 23.

Referring back to FIG. 1, the instruction 102 held in the instruction register 8 is supplied to an instruction decoding section 3 and a branch target address calculating section 7 as an output 103 from the instruction register 8.

The instruction decoding section 3 decodes the instruction 103, thereby identifying the kind of the instruction 103. The identification of the kind of the instruction 103 is accomplished by identifying an opcode stored in a top region of the instruction 103.

In the case where the instruction decoding section 3 identifies the instruction 103 to be a sequential instruction, information 106 indicating the kind of the instruction 103 is supplied to an executing section 11 and information 107 indicating a register specified by the instruction 103 is supplied to a register file 12. The value of the register specified by the information 107 is supplied to the executing section 11 as information 108. For example, in the case where the instruction 103 is an addition instruction of "adding the value of a register (2) to the value of a register (1) and storing the added result in the register (1)", information indicating an "addition instruction" is supplied to the executing section 11 as the information 106 indicating the kind of the instruction 103, and information indicating "the registers (1) and (2)" is supplied to the register file 12 as the information 107 indicating the register specified by the instruction 103.

The executing section 11 executes the instruction based on the information 106 supplied from the instruction decoding section 3 and the information 108 supplied from the register file 12. The execution result obtained by the executing section 11 is, if necessary, output to the register file 12 as an output 109.

In the case where the instruction decoding section 3 identifies the instruction 103 to be a predictive branch instruction, the instruction decoding section 3 supplies an initial value setting signal 104 to a counter section 4 and supplies a value stored in the region 23 of the predictive branch instruction to the counter section 4 as an initial value 105. The level of the initial value setting signal 104 becomes high in a cycle during which the initial value 105 is set, and remains low in other cycles.

The counter section 4 holds a count value. The count value is used to define a branch timing of the predictive branch instruction. The count value is, for example, an integer. The count value held in the counter section 4 is initialized to the initial value 105 in response to the initial value setting signal 104. The initial value 105 is a value stored in the region 23 of the predictive branch instruction. The count value held in the counter section 4 is decremented by 1 in response to a signal 110 supplied from the program counter 2. The signal 110 is output to the counter section 4 in synchronization with the increment of the value of the program counter 2 by 1.

The counter section 4 compares a count value held in the counter section 4 with a predetermined threshold value. In the case where the count value is equal to the predetermined threshold value, the counter section 4 outputs a selection signal 111 having a high level to a selector 5 and outputs a cancel signal 116 having a high level to the instruction register 8. In other cases, the counter section 4 outputs a selection signal 111 having a low level to the selector 5 and outputs a cancel signal 116 having a low level to the instruction register 8. The selection signal 111 is used for changing the address of the instruction to be fetched next time into the branch target address. The cancel signal 116 is used for cancelling the instruction fetched to the instruction register 8.

The selector 5 selects either one of an output 112 from an adder 9 and an output 113 from a branch target address register 6 in accordance with the level of the selection signal 111. In the case where the selection signal 111 has a high level, the selector 5 selects the output 113 from the branch target address register 6. On the other hand, in the case where the selection signal 111 has a low level, the selector 5 selects the output 112 from the adder 9. An output 115 of the selector 5 is supplied to the program counter 2.

A calculation result 114, i.e., the branch target address of the predictive branch instruction, is obtained by the branch target address calculating section 7. The calculation result 114 is supplied to the branch target address register 6. The branch target address register 6 supplies the calculation result 114 to the selector 5 as the output 113. Thus, the branch target address register 6 provides the branch target address of the predictive branch instruction for the program counter 2 via the selector 5.

The adder 9 increments the value of the program counter 2 by 1 and then supplies the incremented value to the selector 5 as the output 112. The adder 9 is used for calculating the address of an instruction following a sequential instruction.

Processing performed during the period from a point where the address 101 is output from the program counter 2 to a point where an instruction 102 corresponding to the address 101 is fetched to the instruction register 8 will be called an "instruction fetch".

Processing executed by the instruction decoding section 3 will be called an "instruction decode". Processing executed during the period from a point where the calculation of a branch target address is started by the branch target address calculating section 7 to a point where the calculation result is stored in the branch target address register 6 will be called a "branch target address calculation". The pipeline processor 100 executes the "instruction decode" and the "branch target address calculation" within one and the same cycle.

Processing of the executing section 11 for executing instructions based on the information 106 and 108 will be called an "instruction execution". Processing of the executing section 11 for storing the information 109 in the register file 12 will be called a "write back".

In this way, processing in the pipeline processor 100 is executed, for example, by repeating "instruction fetch", "instruction decode", "instruction execution" and "write back".

Figure 3:
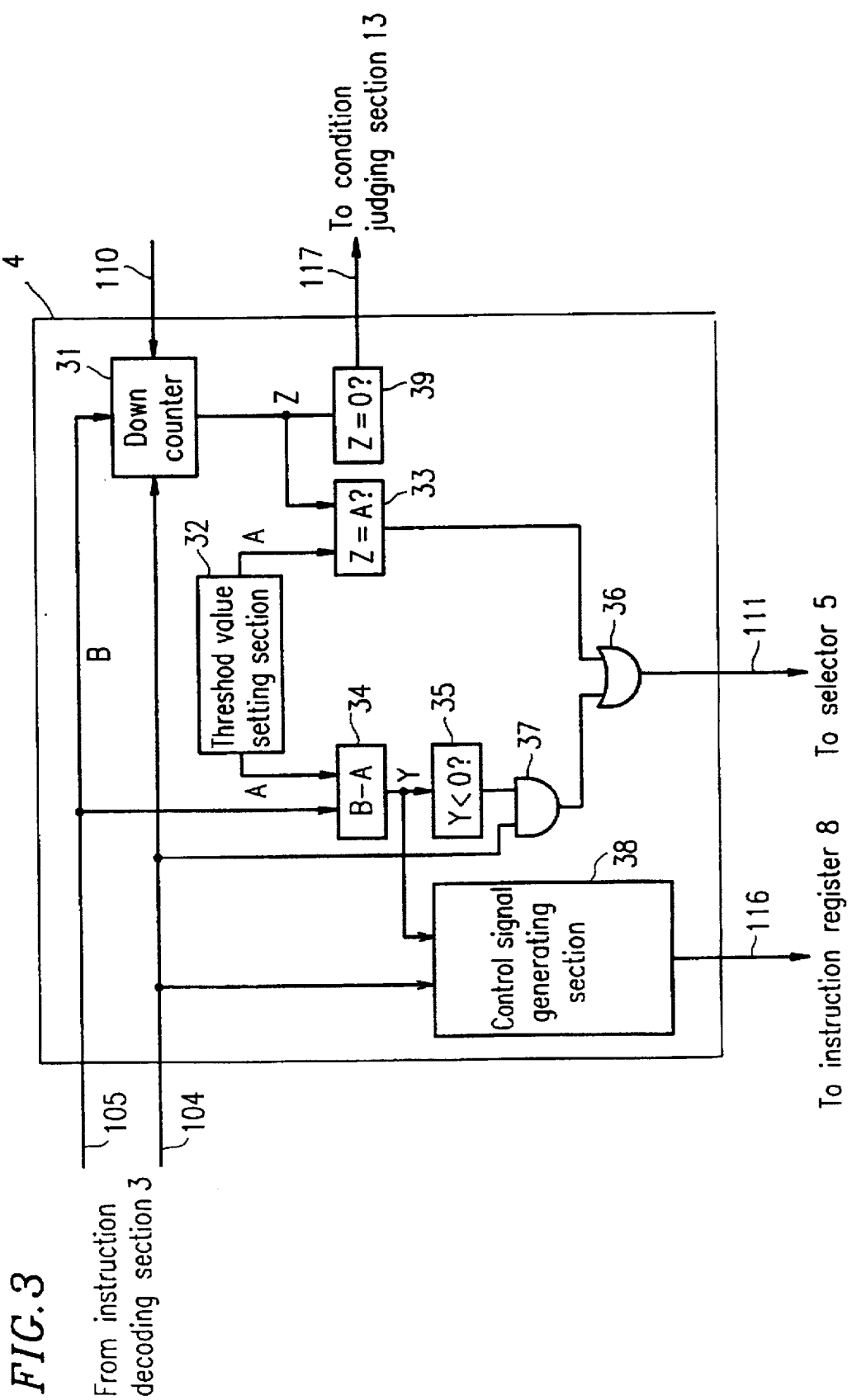
FIG. 3 is a block diagram showing a configuration for a counter section 4.

FIG. 3 shows a configuration for the counter section 4. The counter section 4 includes a down counter 31 for holding a count value Z.

The initial value 105 and the initial value setting signal 104 are input to the down counter 31. In the case where the initial value setting signal 104 has a high level, the count value Z held in the down counter 31 is initialized to the initial value 105. As described above, the initial value 105 is equal to the number of instructions, stored in the region 23 of the predictive branch instruction, from the predictive branch instruction to the branch point. In the following description, the initial value 105 is assumed to be equal to a value B.

A signal 110 is further input to the down counter 31. In response to the signal 110, the count value Z held in the down counter 31 is decremented by 1. The count value Z is output to a comparator 33.

The comparator 33 judges whether or not the count value Z is equal to a threshold value A. The threshold value A is supplied from a threshold value setting section 32. The threshold value A is previously set by the threshold value setting section 32 to be equal to the number of the cycles required for fetching one instruction (hereinafter, such a number will be referred to as an "instruction fetch cycle number"). In the case where the count value Z is equal to the threshold value A, the comparator 33 supplies a signal having a high level to one of the inputs of an OR circuit 36. In the other cases, the comparator 33 supplies a signal having a low level to one of the inputs of the OR circuit 36. An output of an AND circuit 37 is supplied to the other input of the OR circuit 36.

A subtracter 34 subtracts the threshold value A from the initial value B. A subtraction result Y is supplied to a judging section 35 and a control signal generating section 38.

The judging section 35 judges whether or not the subtraction result Y is smaller than zero. In the case where the subtraction result Y is smaller than zero, the judging section 35 supplies a signal having a high level to one of the inputs of the AND circuit 37. In the other cases, the judging section 35 supplies a signal having a low level to one of the inputs of the AND circuit 37. The initial value setting signal 104 is supplied to the other input of the AND circuit 37.

Thus, only in the case where (B<A) or in the case where (Z=A), does the level of the output from the OR circuit 36 become high. In the other cases, the level of the output from the OR circuit 36 becomes low. Therefore, only in the case where (B<A) or in the case where (Z=A), is the output 113 of the branch target address register 6 output from the selector 5. In the other cases, the output 112 of the adder 9 is output from the selector 5.

The control signal generating section 38 generates the cancel signal 116 in accordance with the initial value setting signal 104 and the subtraction result Y.

Figure 4A:
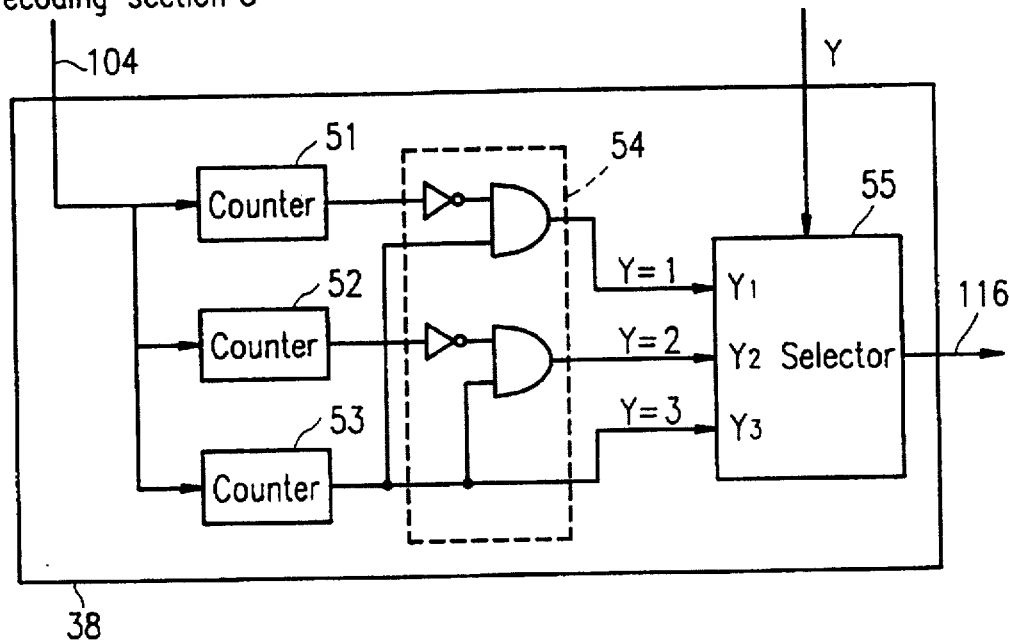

FIG. 4A shows an exemplary configuration for the control signal generating section 38 in which the instruction fetch cycle number is three. In the cases where the instruction fetch cycle number is other than three, the control signal generating section 38 may be configured in a similar manner to the control signal generating section 38 shown in FIG. 4A.

The control signal generating section 38 includes counters 51 to 53, a logical circuit 54 and a selector 55.

Each of the counters 51 to 53 outputs a signal in response to the initial value setting signal 104. The outputs of the counters 51 to 53 are input to input terminals $Y_1$ to $Y_3$ of the selector 55 via the logical circuit 54, respectively.

The selector 55 selectively outputs one of the three signals input to the input terminals $Y_1$ to $Y_3$ in accordance with the value of the subtraction result Y input thereto from the subtracter 34. In the case where Y=1, the selector 55 outputs a signal input to the input terminal $Y_1$; in the case where Y=2, the selector 55 outputs a signal input to the input terminal $Y_2$; and in the case where Y=3, the selector 55 outputs a signal input to the input terminal $Y_3$. The output of the selector 55 is supplied to the instruction register 8 as the cancel signal 116.

Figure 4B:
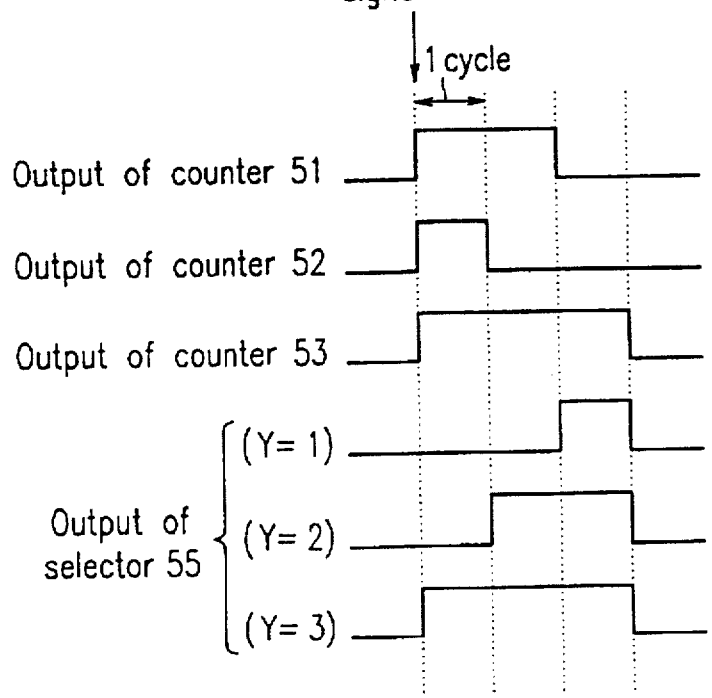
FIG. 4B is a waveform chart showing the waveforms of the signals in the control signal generating section 38.

FIG. 4B shows the waveforms of the outputs of the counters 51 to 53 and the waveform of the output of the selector 55. The instruction held in the instruction register 8 is cancelled in the cycle during which the level of the output of the selector 55 becomes high.

Figures 5A, 5B:
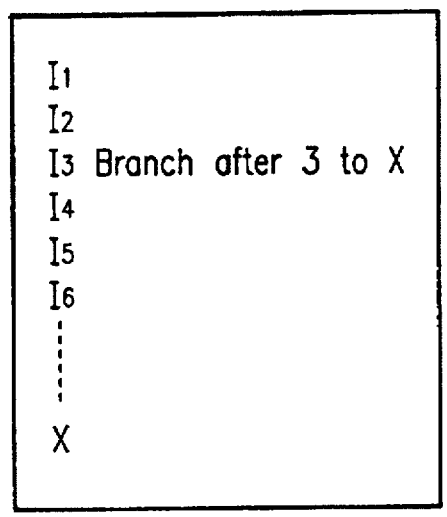

FIG. 5A shows a program code sequence including a predictive branch instruction. In FIG. 5A, $I_1$, $I_2$, $I_4$, $I_5$ and $I_6$ denote sequential instructions; $I_3$ denotes a predictive branch instruction "Branch after 3 to X"; and X denotes a branch target instruction of the predictive branch instruction.

FIG. 5B shows the operation of the pipeline processor 100 in the case where the instruction fetch cycle number is 2 and a predictive branch instruction $I_3$, in which the instruction number from a current execution instruction to a branch point is 3, is executed. In this case, A=2 and B=3.

In FIG. 5B, $IF_1$ and $IF_2$ denote respective "instruction fetch" cycles; ID denotes an "instruction decode" cycle; EX denotes an "instruction execution" cycle; and WB denotes a "write back" cycle.

In the cycle $C_3$, the predictive branch instruction $I_3$ is decoded by the instruction decoding section 3. As a result, a value B (=3) stored in the region 23 of the predictive branch instruction $I_3$ is input to the down counter 31 (FIG. 3) as the initial value 105. The count value Z held in the down counter 31 is initialized to 3. The count value Z held in the down counter 31 is decremented by 1 in each of the cycles $C_4$ to $C_6$.

In the cycle $C_4$, the count value Z held in the down counter 31 becomes equal to the threshold value A (=2) set by the threshold value setting section 32 (FIG. 3). As a result, in the cycle $C_4$, the level of the selection signal 111 becomes high and the output of the selector 5 is switched from the output 112 of the adder 9 into the output 113 of the branch target address register 6.

In FIG. 5B, S indicates that the output 115 of the selector 5 is the output 112 (sequential instruction address) while B indicates that the output 115 of the selector 5 is the output 113 (branch target address).

Figure 6:
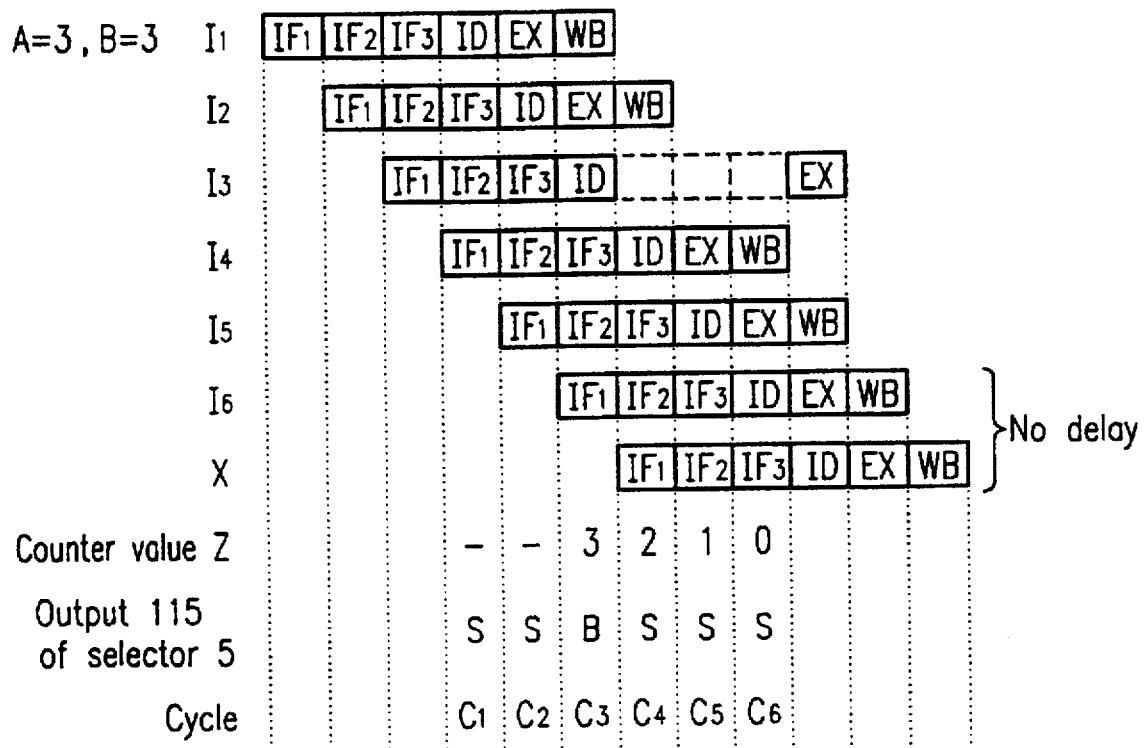
FIG. 6 is a timing chart illustrating the operation of the pipeline processor 100 in the case where A=3 and B=3.

FIG. 6 shows the operation of the pipeline processor 100 in the case where the instruction fetch cycle number is 3 and a predictive branch instruction $I_3$, in which the instruction number from a current execution instruction to a branch point is 3, is executed. In this case, A=3 and B=3.

In FIG. 6, $IF_1$ to $IF_3$ denote respective "instruction fetch" cycles; ID denotes an "instruction decode" cycle; EX denotes an "instruction execution" cycle; and WB denotes a "write back" cycle.

In the cycle $C_3$, the count value Z held in the down counter 31 (FIG. 3) is initialized to 3. The count value Z held in the down counter 31 is decremented by 1 in each of the cycles $C_4$ to $C_6$.

In the cycle $C_3$, the count value Z held in the down counter 31 becomes equal to the threshold value A (=3) set by the threshold value setting section 32 (FIG. 3). As a result, in the cycle $C_3$, the level of the selection signal 111 becomes high and the output of the selector 5 is switched from the output 112 of the adder 9 into the output 113 of the branch target address register 6.

In FIG. 6, S indicates that the output 115 of the selector 5 is the output 112 (sequential instruction address) while B indicates that the output 115 of the selector 5 is the output 113 (branch target address).

Thus, in the case where A≦B, a delay is not caused by the execution of a branch instruction in the pipeline processor 100. Therefore, stalls in the pipeline are not caused.

Figure 7:
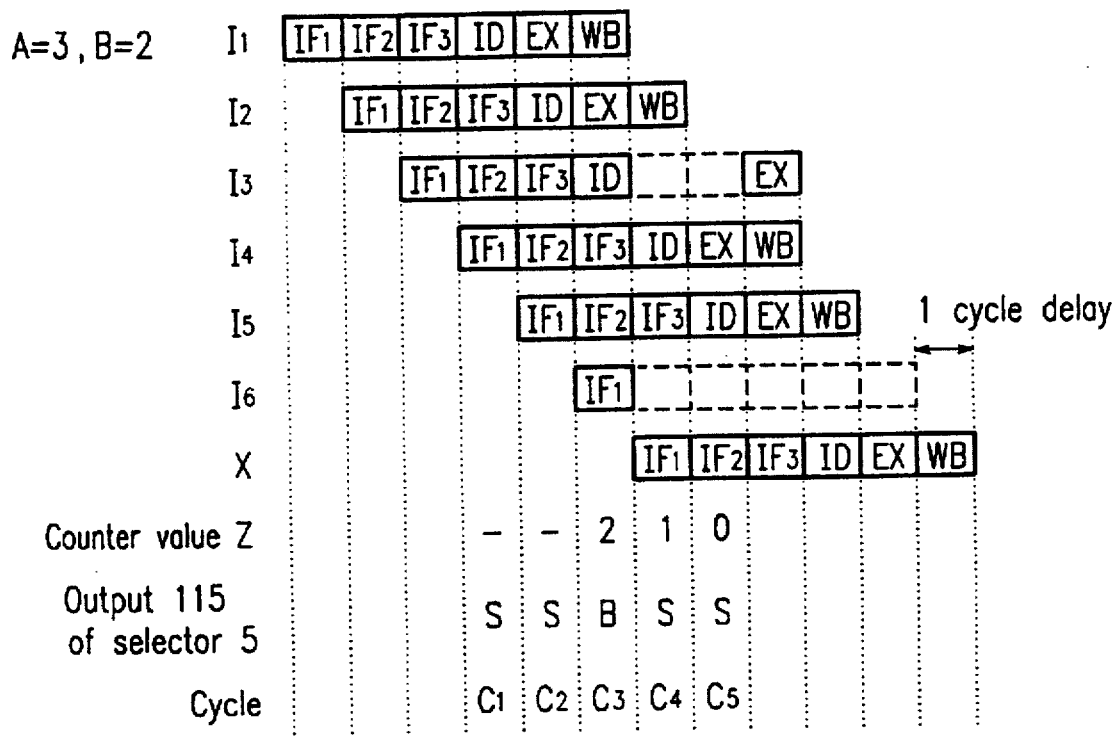
FIG. 7 is a timing chart illustrating the operation of the pipeline processor 100 in the case where A=3 and B=2.

FIG. 7 shows the operation of the pipeline processor 100 in the case where the instruction fetch cycle number is 3 and a predictive branch instruction $I_3$, in which the instruction number from a current execution instruction to a branch point is 2, is executed. In this case, A=3 and B=2.

In FIG. 7, $IF_1$ to $IF_3$ denote respective "instruction fetch" cycles; ID denotes an "instruction decode" cycle; EX denotes an "instruction execution" cycle; and WB denotes a "write back" cycle.

In the cycle $C_3$, the value B (=2) given as the initial value 115 is smaller than the instruction fetch cycle number A (=3). As a result, in the cycle $C_3$, the level of the selection signal 111 becomes high and the output of the selector 5 is switched from the output 112 of the adder 9 into the output 113 of the branch target address register 6.

In FIG. 7, S indicates that the output 115 of the selector 5 is the output 112 (sequential instruction address) while B indicates that the output 115 of the selector 5 is the output 113 (branch target address).

Figure 8:
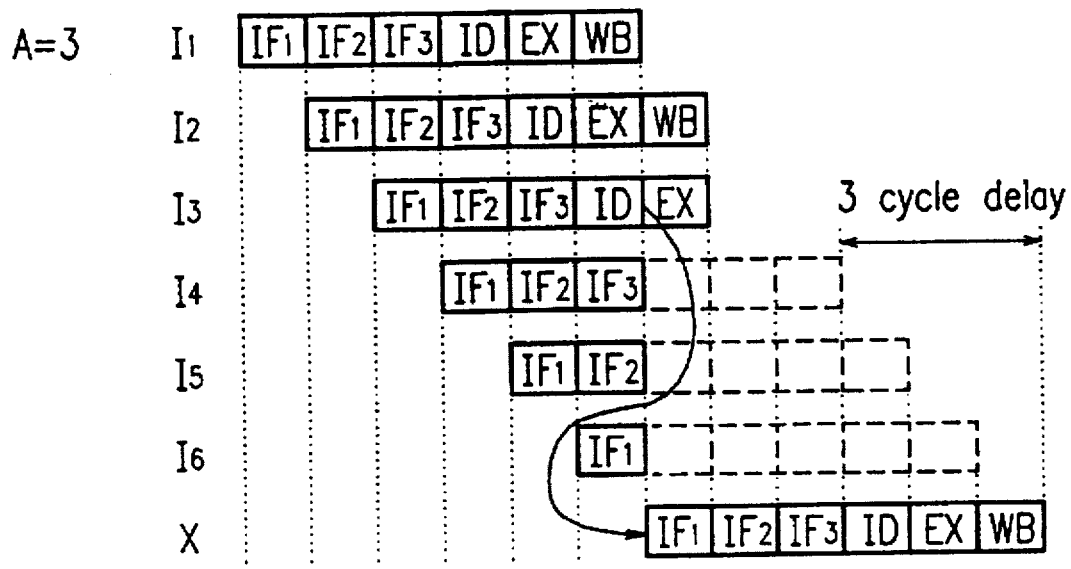
FIG. 8 is a timing chart illustrating the operation of a conventional pipeline processor 100 in the case where A=3.

Thus, in the case where A>B, a delay is caused by the execution of a branch instruction in the pipeline processor 100. However, in the case shown in FIG. 7, the number of cycles corresponding to the delay (hereinafter, such a number will be referred to as a "delay cycle number") is 1. On the other hand, in the case where A=3, the delay cycle number is 3 if the branch instruction is executed in a conventional manner (see FIG. 8).

Accordingly, the pipeline processor 100 can reduce the delay caused by the execution of a predictive branch instruction as compared with the case of using a conventional processor. As a result, stalls in the pipeline can be minimized.

Next, a timing at which the branch conditions for a predictive branch instruction are judged will be described. As shown in FIGS. 5B, 6 and 7, the "instruction execution (EX)" cycle of a predictive branch instruction $I_3$ is a cycle next to the cycle in which the count value Z held in the down counter 31 (FIG. 3) becomes zero. This fact involves a timing at which the branch conditions for the predictive branch instruction $I_3$ are judged is postponed in accordance with the instruction number B from a current execution instruction to a branch point. Accordingly, even in the case where a sequential instruction following a predictive branch instruction is an instruction affecting the judgement of branch conditions of the predictive branch instruction, it is possible to exactly judge the branch conditions.

Such a timing at which the branch conditions are judged can be defined by providing a judging circuit 39 (FIG. 3) for the counter section 4.

The judging circuit 39 judges whether or not the count value Z held in the down counter 31 is equal to zero. In the case where the count value Z held in the down counter 31 is equal to zero, the judging circuit 39 outputs a signal 117 having a high level. In the other cases, the judging circuit 39 outputs a signal 117 having a low level. The signal 117 is supplied to the condition judging section 13.

FIG. 9 shows a configuration for the condition judging section 13. The condition judging section 13 judges whether or not the control flow should be changed (or whether or not a branch to a branch target address should be executed) for a predictive branch instruction.

The condition judging section 13 includes: a condition code 61; a branch condition judging section 62 for judging the value of the condition code 61 based on the branch conditions defined by an opcode stored in the region 21 of the predictive branch instruction; and an AND circuit 63.

The executing section 11 updates the value of the condition code 61 based on the execution result 109. The condition code 61 is composed of four bits: Z (1 bit), N (1 bit), V (1 bit) and C (1 bit), for example. Z denotes a zero flag, N denotes a negative flag, V denotes an overflow flag and C denotes a carry flag. Each of these flags has a value, for example, of 0 or 1. The values of these flags are updated by the executing section 11.

The opcode stored in the region 21 of the predictive branch instruction is input from the instruction decoding section 3 to the branch condition judging section 62.

Table 1 shows various types of opcodes stored in the region 21 of the predictive branch instruction. In this example, the opcode is composed of three bits. The opecode may be composed of any arbitrary number of bits other than three.

TABLE 1

| Opecode | Operation | Branch Condition |
| --- | --- | --- |
| 100 | Branch on not equal | not Z |
| 101 | Branch on equal | Z |
| 010 | Branch on greater than | not C |
| 011 | Branch on less than | C |
| 110 | Branch on positive | not N |
| 111 | Branch on negative | N |
| 000 | Branch on overflow clear | not V |
| 001 | Branch on overflow set | V |

For example, an opecode "100" corresponds to an instruction "Branch on not equal", i.e., an instruction to "branch to the branch target address if a condition that the value of the zero flag Z of the condition code 61 is not equal to zero is satisfied". In the case where the branch condition judging section 62 receives the opecode "100" from the instruction decoding section 3, the branch condition judging section 62 judges whether or not the value of the zero flag Z of the condition code 61 is zero.

In the case where the value of the zero flag Z is not equal to zero (or in the case where the branch conditions defined by the opecode "100" are satisfied), the branch condition judging section 62 supplies a signal having a high level to an inversion input of the AND circuit 63. On the other hand, in the case where the value of the zero flag Z is equal to zero (or in the case where the branch conditions defined by the opcode "100" are not satisfied), the branch condition judging section 62 supplies a signal having a low level to an inversion input of the AND circuit 63.

A signal 117 defining a timing at which the branch conditions are judged is supplied from the judging circuit 39 of the counter section 4 to the input of the AND circuit 63.

Thus, the level of the output of the AND circuit 63 becomes high in the case where the branch conditions are not satisfied at the timing at which the branch conditions are judged. In other cases, the level of the output of the AND circuit 63 becomes low.

The output of the AND circuit 63 is supplied to the instruction register 8, the instruction decoding section 3 and the executing section 11 as a signal cancelling the instruction in the pipeline. In the cycle during which the level of the output of the AND circuit 63 becomes high, each of the instruction register 8, the instruction decoding section 3 and the executing section 11 cancels the instruction.

In the example shown in FIG. 9, the condition judging section 13 is assumed to judge whether or not the branch is executed based on the condition code 61 for simplifying the illustration. However, the condition judging section 13 may be configured to judge whether or not the branch is executed based on other conditions. For example, the condition judging section 13 may judge whether or not the branch is executed based on the value of a particular register (or registers) in the register file 12.

Hereinafter, the position of the predictive branch instruction in the program code will be described.

Figure 10A:
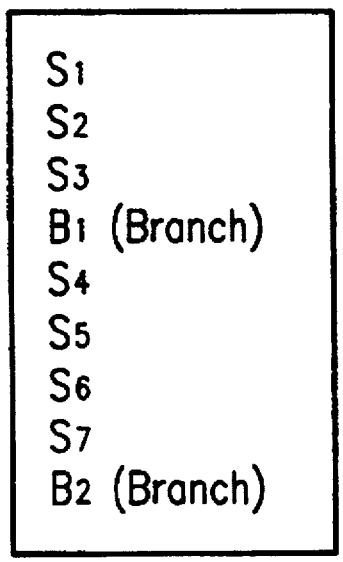

FIG. 10A shows an exemplary program code sequence including a conventional branch instruction. In FIG. 10A, $S_1$ to $S_3$ and $S_4$ to $S_7$ denote sequential instructions while $B_1$ and $B_2$ denote branch instructions.

Figure 10B:
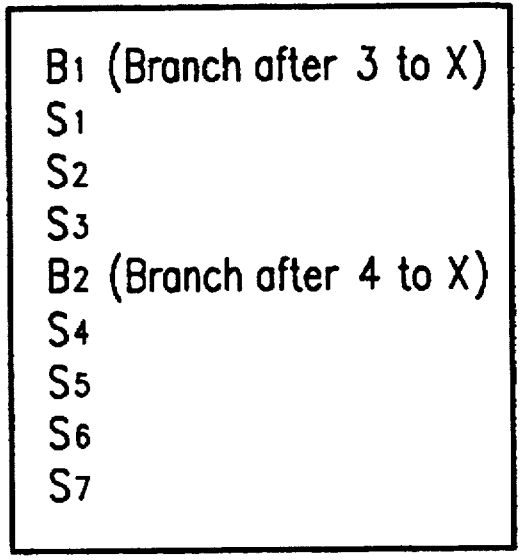
FIG. 10B is a diagram showing a program code sequence including a predictive branch instruction.
Figure 11:
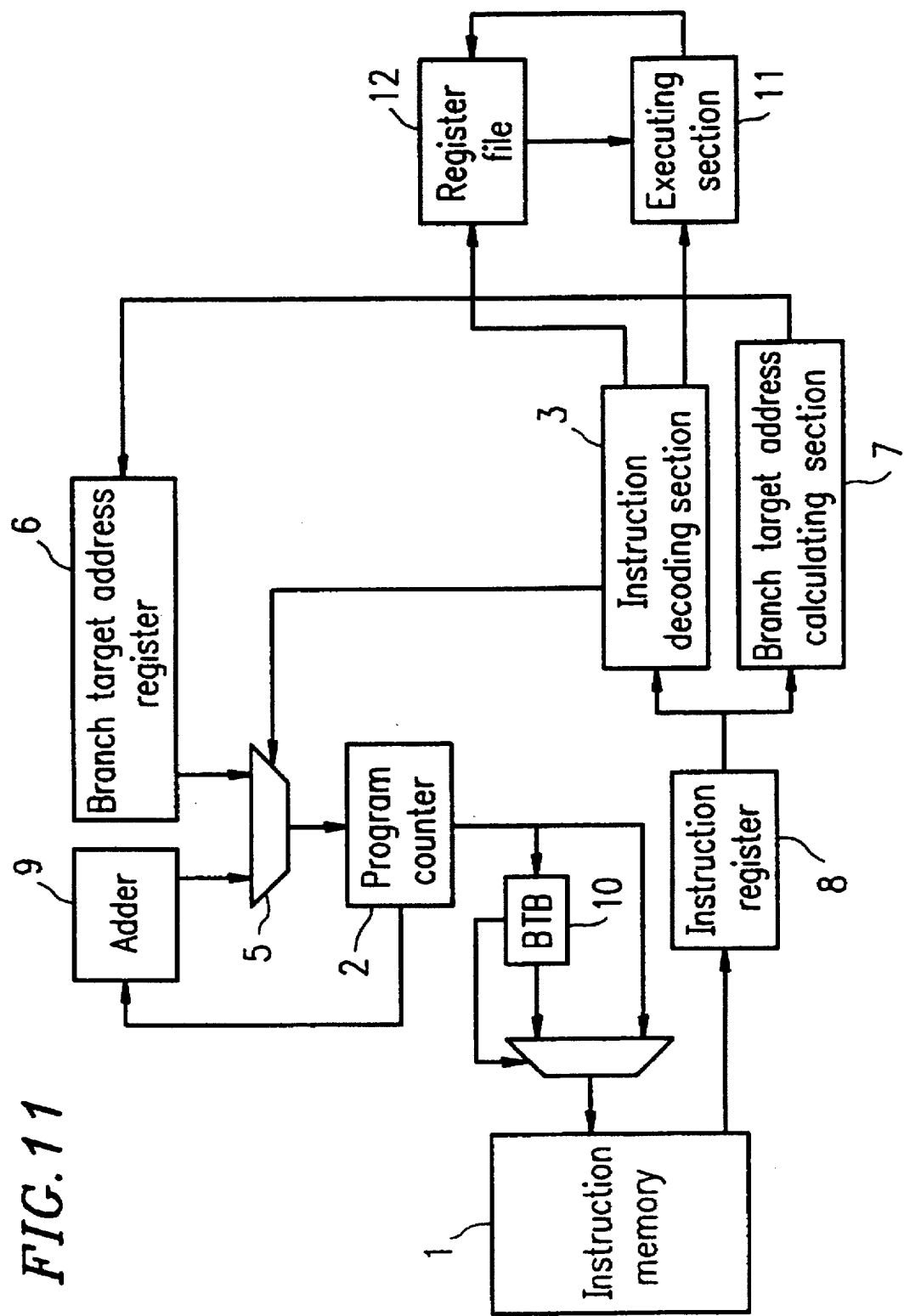
FIG. 11 is a block diagram showing a configuration for a conventional processor using a BTB.
Figure 12:
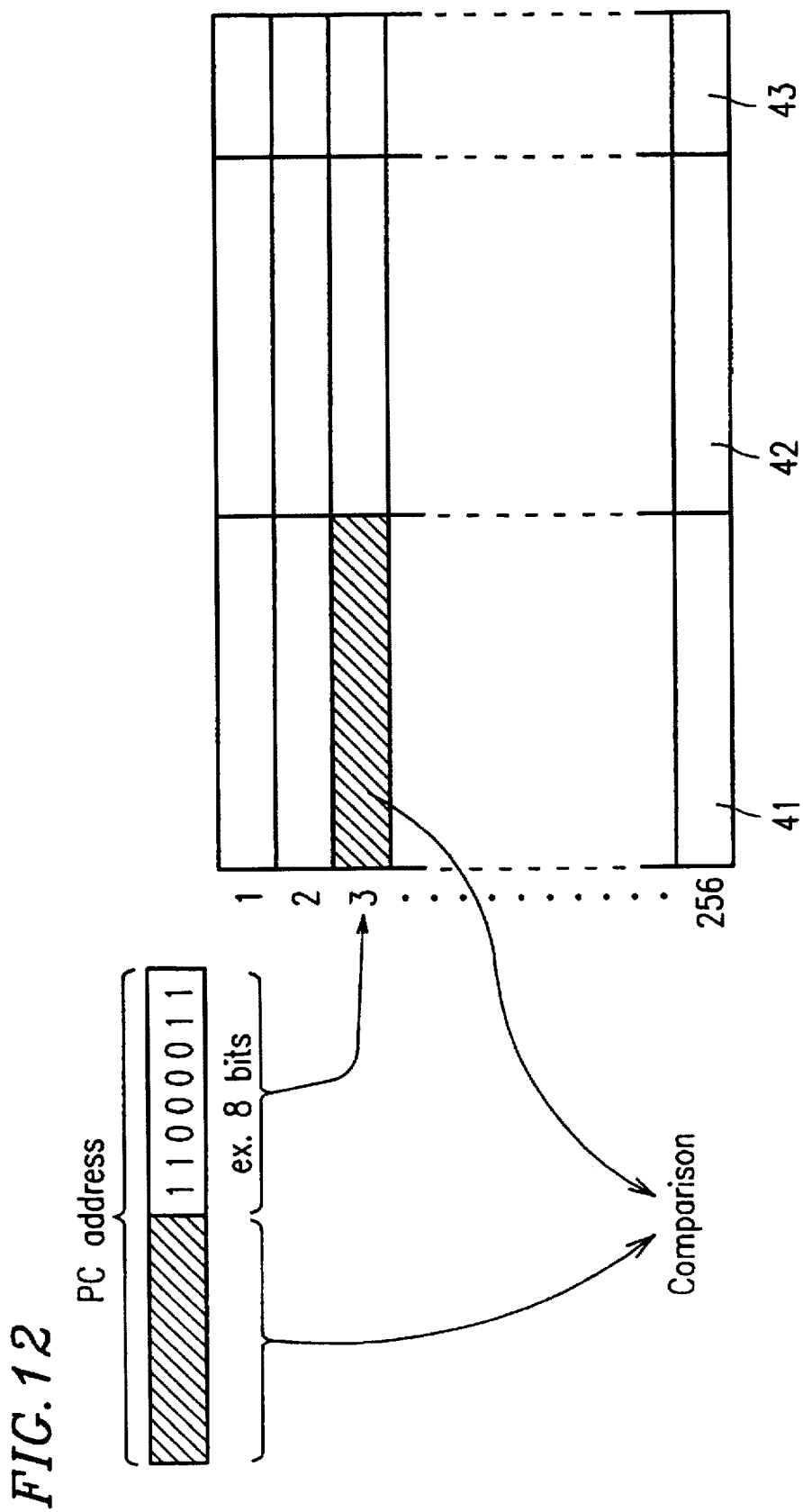
FIG. 12 is a diagram showing an exemplary format for a BTB.

FIG. 10B shows an exemplary program code sequence including a predictive branch instruction. In FIG. 10B, $S_1$ to $S_3$ and $S_4$ to $S_7$ denote sequential instructions, $B_1$ denotes a predictive branch instruction to branch after three instructions are executed, and $B_2$ denotes a predictive branch instruction to branch after four instructions are executed. The order in which the instructions are executed in the program code shown in FIG. 10B is equal to the order in which the instructions are executed in the program code shown in FIG. 10A.

In an optimum arrangement of predictive branch instructions in a program code, each of the predictive branch instructions is located immediately adjacent to a previous branch point (or a point where the branch is actually caused), as shown in FIG. 10B. Such an arrangement of the predictive branch instructions does not adversely affect the judgement of the conditions for the predictive branch instructions. The timing at which the branch conditions are judged for the predictive branch instructions is appropriately postponed based on the count value Z held in the down counter 31. Therefore, even in the case where a sequential instruction following the predictive branch instruction affects the judgement of the branch conditions for the predictive branch instruction, the branch conditions can be judged in view of the result caused by the influence thereof.

The above-described pipeline processor 100 can improve not only the hardware aspects, but also the software aspects. In other words, the pipeline processor 100 can improve the portability of a program code.

For example, the pipeline processor 100 can execute a program code including a conventional branch instruction.

This is because a predictive branch instruction "Branch after 0 to X" (or a predictive branch instruction to "branch to the instruction X after a number 0 of instruction is executed") is equivalent to a conventional branch instruction, which ensures a continuous use of a program code which was produced in the past.

In addition, in the case where the pipeline processor 100 is implemented in two kinds of hardware having respectively different instruction fetch cycle numbers, it is possible to use one and the same program code for both kinds of hardware, which also ensures a continuous use of a program code which was produced in the past.

A delayed branch method cannot ensure a continuous use of a program code. For example, it is impossible to execute a program code produced in a delay slot=2 in a hardware corresponding to a delay slot=3. Even if such an execution is forced to occur, the performance of the hardware is considerably degraded. The method of the invention is significantly in contrast with the delayed branch method in this respect.

In order to catch up with the recent trend of continuous increase in the instruction fetch cycle number, hardware cannot but be updated. However, updating software requires far greater costs than updating hardware. Therefore, it is very significant to ensure a continuous use of a program which was produced in the past.

In the pipeline processor according to the present invention, it is possible to prevent a delay caused by the execution of a branch instruction without using a memory of a large capacity or affecting an operation rate. In addition, it is possible to prevent a delay by the execution of a branch instruction even when the number of the cycles required for fetching one instruction increases.

Furthermore, the pipeline processor of the invention does not require any special hardware.

Moreover, in the pipeline processor of the invention, a branch target address can be calculated before reaching a branch point, so that it is no longer necessary to wait for the calculation of the branch target address to end in a fetch switching operation from a sequential instruction into a branch target instruction. As a result, it is possible to eliminate stalls in the pipeline which have conventionally been caused by the execution of a branch instruction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A pipeline processor for executing a predictive branch instruction defining a number of at least one instruction which is to be executed in succession after the predictive branch instruction is given before a control flow is changed, comprising:

a program counter for holding an address of an instruction to be fetched;

an instruction memory for outputting an instruction corresponding to the address held by the program counter;

an instruction register for fetching and holding the instruction output from the instruction memory;

an instruction decoding section for decoding the instruction held by the instruction register, thereby judging whether or not the instruction is the predictive branch instruction;

a counter section for holding a counter value and comparing the counter value with a predetermined threshold value, the counter value being initialized to the number defined by the predictive branch instruction and being decremented in synchronization with an increment of the program counter;

an adder for incrementing the address held by the program counter and providing the incremented address as a sequential instruction address;

a branch target address register for providing a branch target address of the predictive branch instruction; and a selector for selecting one of the sequential instruction address and the branch target address of the predictive branch instruction in accordance with a comparison result obtained by the counter section.

2. A pipeline processor according to claim 1, wherein the predictive branch instruction comprises: a region for storing an opcode identifying a kind of the instruction; a region for specifying the branch target address; and a region for storing the number of at least one instruction which is to be executed in succession after the predictive branch instruction is given before a control flow is changed.

3. A pipeline processor according to claim 1, wherein the predetermined threshold value is equal to a number of cycles required for fetching one instruction.

4. A pipeline processor according to claim 1, wherein, in a case where the counter value is equal to the predetermined threshold value, the counter section outputs a selection signal selecting the branch target address of the predictive branch instruction to the selector.

5. A pipeline processor according to claim 1, wherein, in a case where the number defined by the predictive branch instruction is smaller than the predetermined threshold value, the counter section outputs a selection signal selecting the branch target address of the predictive branch instruction to the selector.

6. A pipeline processor according to claim 1, wherein, in a case where the number defined by the predictive branch instruction is smaller than the predetermined threshold value, the counter section outputs a cancel signal cancelling the instruction held by the instruction register to the instruction register.

7. A pipeline processor according to claim 1, further comprising a condition judging section for judging whether or not the control flow is to be changed to the predictive branch instruction, wherein, when the counter value reaches the predetermined value, the counter section outputs a signal defining a timing at which it is judged whether or not the control flow is to be changed to the predictive branch instruction to the condition judging section.

8. A pipeline processor according to claim 7, wherein, in a case where the condition judging section judges that the control flow is not to be changed to the predictive branch instruction, the condition judging section outputs a signal cancelling the instruction held by the instruction register to the instruction register and outputs a signal cancelling the instruction to be decoded by the instruction decoding section to the instruction decoding section.

* * * * *